US012650075B2

(12) United States Patent
　　Khalil De Oliveira et al.

(10) Patent No.: US 12,650,075 B2
(45) Date of Patent: Jun. 9, 2026

(54) SYSTEM FOR MONITORING REAL-TIME FLOW ASSURANCE OCCURRENCES

(71) Applicant: Petróleo Brasileiro S.A.—Petrobras, Rio de Janeiro (BR)

(72) Inventors: Marcia Cristina Khalil De Oliveira, Rio de Janeiro (BR); Guilherme Dos Santos Vieira Lima, Rio de Janeiro (BR); Andreia Souza Carvalho, Rio de Janeiro (BR); Daniel Monteiro Pimentel, Rio de Janeiro (BR); Thiago Geraldo Da Silva, Rio de Janeiro (BR); Rogerio Leite Alves Pinto, Macaé (BR); Luiz Fernando Rambalducci Dalla, Vitória (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 507 days.

(21) Appl. No.: 17/991,952

(22) Filed: Nov. 22, 2022

(65) Prior Publication Data

US 2023/0160297 A1　May 25, 2023

(30) Foreign Application Priority Data

Nov. 25, 2021　(BR) ...................... 10 2021 023764 3

(51) Int. Cl.
　　*E21B 47/10*　　(2012.01)
　　*G01F 1/74*　　(2006.01)
　　*G01F 1/88*　　(2006.01)

(52) U.S. Cl.
　　CPC ............... *E21B 47/10* (2013.01); *G01F 1/88* (2013.01); *E21B 2200/20* (2020.05); *G01F 1/74* (2013.01)

(58) Field of Classification Search
　　CPC .......... E21B 41/00; E21B 47/00; E21B 43/00; E21B 47/06; E21B 49/00; E21B 37/00;
　　　　　　(Continued)

(56) References Cited

U.S. PATENT DOCUMENTS

| 10,311,173 | B2 | 6/2019 | Havre et al. |
| 2016/0186533 | A1* | 6/2016 | Donzier ................. E21B 43/01 |
| | | | 702/6 |

(Continued)

OTHER PUBLICATIONS

Qin, Hao, et al. "Machine learning models to predict gas hydrate plugging risks using flowloop and field data." Offshore technology conference. OTC, 2019. (Year: 2019).*

(Continued)

*Primary Examiner* — Catherine T. Rastovski
*Assistant Examiner* — Carter W Ferrell
(74) *Attorney, Agent, or Firm* — Morrison & Foerster LLP

(57) ABSTRACT

The present invention addresses to a real-time flow assurance occurrence monitoring system with the aim of reducing oil production losses caused by occurrences in the flow assurance area, which uses a web tool to integrate results of simulations of multiphase flow and thermodynamic simulators with production data and specific correlations, developed to monitor the formation of deposits or blockages in subsea lines. This tool has the specific objective of monitoring the formation of hydrates, paraffins and emulsions in real time and other occurrences that may cause a production shutdown. Based on this information, it issues an alert of the occurrence in the control rooms of the operational units, supporting decision-making on operational procedures that must be carried out to avoid the loss of oil production. It further records the operations carried out to mitigate occurrences. All data is structured in tables and graphs and can be exported to other systems.

6 Claims, 4 Drawing Sheets

(58) Field of Classification Search
CPC .. E21B 2200/20; E21B 41/0099; E21B 47/10;
G01F 1/88; G01F 1/74; C09K 8/52;
C09K 2208/22
See application file for complete search history.

(56)                    References Cited

U.S. PATENT DOCUMENTS

| | | | | |
|---|---|---|---|---|
| 2016/0208601 | A1* | 7/2016 | Molla | G01N 33/28 |
| 2018/0066501 | A1* | 3/2018 | Chidiac | G06F 30/20 |
| 2019/0302306 | A1* | 10/2019 | Kulbrandstad | G01R 33/60 |
| 2020/0372195 | A1* | 11/2020 | Kjølaas | G06F 30/28 |
| 2021/0301650 | A1* | 9/2021 | Batarseh | G01N 29/11 |
| 2024/0168195 | A1* | 5/2024 | Mukerji | G01V 20/00 |

OTHER PUBLICATIONS

Nascimento, Júlioc. (2013) "Simulador De Escoamento Multifasico Em Pocos De Petroleo (Sempp)", Dissertation (Masters in Oil Science and Engineering), Federal University of Rio Grande do Norte, Natal—RN, 134 pages.
Souza, Mirandad. (2010) "Modelagem E Simulação De Escoamento Multifásico Em Dutos De Produção De Óleo E Gás Natural", Escola De Química, Universidade Federal Do Rio De Janeiro, 291 pages.

* cited by examiner

SYSTEM FOR MONITORING REAL-TIME FLOW ASSURANCE OCCURRENCES

CROSS-REFERENCE TO RELATED APPLICATION

This application claims priority to Brazilian Application No. 10 2021 023764 3, filed on Nov. 25, 2021, and entitled "SYSTEM FOR MONITORING REAL-TIME FLOW ASSURANCE OCCURRENCES," the disclosure of which is incorporated herein by reference in its entirety.

FIELD OF THE INVENTION

The present invention addresses to a system for monitoring occurrences of flow assurance in real time with application in all maritime production systems of oil and gas, aiming at a better knowledge of the risk of the occurrences of flow assurance and the anticipation of the decision-making, in relation to a prevention procedure capable of monitoring each of these occurrences in real time.

DESCRIPTION OF THE STATE OF THE ART

In oil and gas production, fluids are subjected to pressure and temperature variations that may lead to the formation of organic, inorganic or mixed (organic and inorganic) deposits, which can lead to restrictions in transport capacity or even to a total blockage of the subsea pipeline, characterizing a flow assurance problem. The most common occurrences are caused by the formation of hydrates, emulsions, paraffin deposits and/or inorganic scales and further by hydrodynamic instability.

Production losses related to flow assurance occurrences are of the order of 1% of oil production, which corresponds to about 25,000 bbl/d. In scenarios with high production potential and increasingly complex, whether due to geography, geology or the characteristics of the fluids produced, early identification of an occurrence becomes very important and avoids significant oil and gas losses.

In recent years, proactive measures have been taken by industry, research centers and academia to obtain a better understanding of flow assurance issues, considering laboratory fluid assessments, thermodynamic simulations to predict the risk of occurrences and definition of proper operational procedures. However, we are still faced with characterization data of unstructured fluids, punctual initiatives related to each occurrence, little interaction between areas for understanding and learning about occurrences confirmed in the field, inefficiency of simulators to respond to an occurrence, difficulty in accessing field data, wells without sensors, among others.

Each of the flow assurance occurrences (hydrates, paraffins, emulsion and inorganic scale) has specific characteristics related to the formation mechanisms, the laboratory analyses to which the samples are subjected and, consequently, the methods of prediction, prevention and field remediation.

Currently, in general, flow assurance occurrences are treated in a segmented way, with individualized teams, without an overview of the entire production system. Data from laboratory analyses and field occurrences are described in specific reports and restricted to a few people. Additionally, the thermodynamic and hydrodynamic simulators of multiphase flow are fed with data from the fluids to enable the dimensioning of the production system and prediction of operational problems, providing diagnoses aimed at preventing and solving problems of flow assurance, but they are not always able to represent actual field conditions. These simulators are provided by different software development companies or are developed internally by operators and are specific to each type of occurrence.

Gas hydrates are crystalline solids formed by the combination of water molecules with the light components of the natural gas (methane, ethane, propane and butane) or further other gases such as: $CO_2$, $N_2$ and $H_2S$. The water molecules group together forming a three-dimensional structure that encapsulates the gas. The production of oil and gas in deep and ultra-deep waters creates a favorable scenario for the occurrence of natural gas hydrates due to the conditions of high pressure and low temperature at the seafloor.

The thermodynamic conditions that favor the formation of hydrates can occur anywhere in the production system, such as production lines, service lines (gas lift), gas pipelines and also in subsea equipment (Christmas tree and manifold). This occurrence is highly undesirable, as hydrate crystals can agglomerate and compromise the flow of oil and gas. The occurrence of hydrates can also damage and block valves and instruments. The consequences of this vary from a reduction in the production flow rate to the total shutdown of production and even damages to the mechanical integrity of the system.

Under normal flow conditions, whether or not there is thermal insulation in the lines or other temperature control methods, any reservoir fluid in the subsea production line can cool down, reaching temperature and pressure conditions conducive to the formation of hydrates. The fluid cooling rate is a function of the fluid temperature in the reservoir, the well flow rate, the line diameter and length, and the heat transfer coefficient.

The prediction of hydrate formation in a production system was performed only by thermodynamic modeling of the solid/liquid/gas equilibrium. In the event of a blockage or production shutdown, the operator follows certain procedures to try to identify the cause and check the possibility of hydrate formation, evaluating the performed thermodynamic simulations. In most cases, the time between the occurrence and the decision-making to carry out an operational procedure is long (months) leading to prolonged shutdowns and, consequently, significant oil losses.

Among the operational procedures used to prevent the formation of hydrates, in case of production shutdown, is the use of chemical products called hydrate thermodynamic inhibitors.

The thermodynamic simulators use as input data the composition of gas and water, the type and concentration of thermodynamic inhibitors. From these data, the equilibrium curve ($P \times T$) of hydrate/water/gas, the optimal concentration of thermodynamic inhibitor and the maximum moisture concentration allowed in the gas according to the specified operational conditions are obtained. The equilibrium curve ($P \times T$), as shown in FIG. 1, defines the conditions of pressure and temperature conducive to the formation of hydrates (to the left of the curve) and is designated in the oil industry by the hydrate formation envelope.

Under the pressure and temperature conditions to the right of the curve, the gas is in equilibrium with liquid water. With a decrease in temperature or an increase in pressure, the phase equilibrium curve (liquid water, hydrate and gas) is reached. Further reducing the temperature towards the left of the curve, the pressure and temperature region where the hydrate phase is stable is entered.

Different commercial simulators are available on the market to predict the formation of hydrates, such as: Hyd (Petrobras), PVTSIM (Calsep), Multiflash (Infochem), CSMHYD (Colorado School of Mines) and Hydraflash (Heriot-Watt University).

An important parameter for predicting the nucleation time and the subsequent kinetics of hydrate formation is the sub-cooling of the system, that is, the difference between the fluid temperature and the phase equilibrium temperature at the same pressure. The greater this sub-cooling, the faster the formation of the hydrate will be. For example, it is verified in the laboratory that in sub-cooling above 15° C., the hydrate can be formed in very short periods of less than 1 second. On the other hand, under the conditions of pressure and temperature defined by the equilibrium curve, the formation of hydrate may last for a few hours. Other parameters that also influence the kinetics of hydrate formation are: the water content in the oil, the salinity of the water, agitation and the existence of nucleation points, typically solids in suspension. Not all these parameters are considered in the simulations or during the occurrence evaluation.

The formation of paraffin deposits on the walls of subsea pipes is recurrent in offshore production fields and causes significant losses in oil production, which are in the order of 2,000 bbl/d. These losses are related to the production shutdown time to clean the lines with the deposit.

The paraffins present in oil tend to crystallize when the temperature is reduced during flow, which is a thermodynamic phenomenon. From the moment that the formation of paraffin crystals in oil begins, at temperature values below the WAPT (Wax Appearance Point Temperature), three effects, combined or not, can occur causing impacts on production systems:

(I) increased viscosity of the fluid caused by the dispersed solid phase that is formed, which may promote an increase in pressure drop and change the rheological characteristics of the fluid;

(II) gradual deposition of paraffins on the pipe wall, reducing the cross-sectional area available for fluid flow and, consequently, the production capacity. In extreme cases, it can lead to complete blockage of the pipeline. The steady-state deposition process is caused by the existence of a thermal gradient between the fluid and the (colder) pipe wall which favors the migration of paraffin molecules from the fluid to the wall;

(III) gelation of the fluid during production shutdowns requiring a minimum pressure, so that it is possible to overcome the yield point stress and thus promote plastic deformation, a necessary condition for the resumption of flow.

The previous characterization of the oil and the evaluation of the thermo-hydraulic profile of the production system are essential for the risk management of paraffin crystallization/deposition during production.

The prediction of the risk of paraffin deposition is carried out by characterizing the oil by calorimetric analysis to determine the wax appearance point temperature (WAPT) and the paraffin solubility curve. From the solubility curve obtained, an assessment of the deposition risk is performed based on historical production data. A critical deposition temperature (CDT) is adopted as a criterion, based on the obtained curve. Additionally, to complement the risk assessment and based on possible production scenarios, deposition simulations in commercial simulators are recommended. However, the models implemented in these simulators still have a high associated uncertainty, limiting their use in predicting the severity and location of the deposition in oil production lines.

In practice, the analysis of some production scenarios, with the occurrence of paraffin deposition, shows that the properties of the fluid are not sufficient to, by themselves, define the criticality of the deposition. Flow parameters such as flow rate, cooling rate, gas-liquid ratio, among others, can play an important role in the process and are difficult to reproduce in the laboratory. Furthermore, the impact of each of these variables on deposition is not correctly represented in commercial simulators.

Among the most used methods for removing paraffinic deposits is the use of pigs, mechanical devices used, for example, for cleaning and inspection (instrumented pig) of lines. There is a wide variety of pigs on the market. In a typical field operation, the pig is introduced into the line by equipment installed at the most upstream point of the pipeline (pig launcher) and runs through its entire length being pushed by a motive fluid, which can be oil, diesel, natural gas, nitrogen and water. Deposit removal is carried out by scraping, compression or a combination of different mechanical stresses. At the opposite end of the line, the pig is retrieved (pig receiver) for inspection or reuse. A large part of the removed deposit follows the production flow and a small part is retained in the pig receiver. In several practical situations, the solution for the recovery of lines with severe deposition consists of using pigs with increasing aggressiveness, starting with less efficient pigs, in general with a smaller diameter, which remove little material, and progressively more efficient pigs.

An alternative, or complementary, technique in the remediation of paraffin deposition is the use of solvents. In this case, it is necessary to shut down the production, inject solvent into the line and wait for some time for the solvent to act (soaking). The most efficient solvents for the solubilization of paraffinic deposits are the aromatic ones. For safety reasons (flash point and toxicity), in the field, the most used product is diesel.

Often, in case of severe deposition, the solvent is used together with the pig to improve the cleaning efficiency.

In the oil production process, the formation of water-in-oil (W/O) emulsions is common during the simultaneous flow of oil and co-produced water from the bottom of the well to the surface facilities. The stability of the formed emulsion and the associated viscosity increase can significantly affect the capacity of production systems, especially those located in an offshore environment. In this sense, knowledge of the rheological properties of oils and their emulsions is of vital importance for defining the design bases to be adopted in the dimensioning of production facilities, definition of pumping requirements, handling and processing of these systems.

An emulsion is defined as the mixture of two immiscible liquids, one of which is dispersed in the other, in the form of droplets, and remains stabilized by the action of emulsifying agents. In the oil industry, an emulsion can be either a water-in-oil (W/O) type, when water droplets are dispersed in the oil, formed during flow, or an oil-in-water (O/W) type, such as oily water.

The rheological properties, in particular viscosity, are important parameters for evaluating the properties and stability of emulsions. The absolute viscosity represents the measure of the fluid resistance to flow, and its unit in the international system is the Pascal-second (Pa·s). The viscosity of a W/O emulsion is generally associated with several factors, among which are: the volumetric fraction of the internal phase, $\phi$; oil viscosity; the temperature; the distribution and average size of the drops; and the presence of solids (clay, sulfates, paraffin crystals, among others).

Most of the time, the increase in the volumetric fraction of water in oil occurs progressively in mature fields. In order to predict the behavior of the fluids during the production time of a field, oil emulsions with different water contents are prepared in the laboratory and evaluated by rheology. The rheological evaluations of emulsions synthesized with Brazilian oils showed that emulsions with a water content of 30% have viscosity values about 2 to 5 times higher than the viscosity of pure oil. Meanwhile, with water content of 50% and 70%, the increase is even greater, varying between 5 and 90 times. This increase in viscosity can promote a significant increase in the pressure drop of the produced fluid flow and further cause instability in the flow.

The rheological properties of these emulsions are evaluated in the laboratory with different water contents, under different conditions of temperature, pressure and shear rate to represent the flow conditions during the production time of a well. The obtained viscosity values are fed into the flow simulators to predict the pressure drop of the flow, considering the conditions of the production scenario. Based on this information, alternatives are evaluated to improve flow and, consequently, increase oil production.

The emulsion formation occurs in all producing fields after the start of water production, and the approach that was given to the subject matter was the preparation of reports with the rheological evaluation data in laboratories, intended only for applicants, thermodynamic simulation only in specific cases and little performance in the evaluation of alternatives for the reduction of the generated flow loss.

The saline water of the formation is in chemical equilibrium with the rocks and their different minerals, under the temperature and pressure conditions prevailing in the reservoir. This water may or may not be saturated with the different ions present in its composition. When formation water moves from the reservoir to the surface, there is a reduction in temperature and pressure sufficient to change this chemical equilibrium. The output of gases originally dissolved in water, and in oil, also contributes to disturbing the ionic equilibrium of the formation water. Because of this, along the flow of water from the reservoir to the surface, ionic equilibria are established, chemical precipitates can be formed and, with thermodynamically favorable conditions, these precipitates can agglomerate to form a solid phase of varied composition that can buffer the porous medium or adhere to different parts of the production system.

The scales are inorganic compounds deposited gradually during the production process of the aqueous fluids of the reservoir. The formation of these scales is due to the precipitation of salts present in the water during the production process, and can occur in different compositions and intensities from the reservoir rock to the surface installations (production string, subsurface safety valve, separator vessels, hydrocyclones, cooling towers, heat exchangers, evaporators, etc.).

In general, these scales are consistent and have high hardness, are not easily detached, and may cause obstructions in valves, equipment, pumps, filters and production string, causing significant losses in oil production.

The lifetime of scaled equipment can be significantly reduced and production costs can increase proportionately, as more frequent shutdowns for cleaning are required. Due to the problems they cause, scales cause not only great direct damages, but also operational risks and expenses for their removal. In most cases, scale problems progressively increase with the increase in the amount of water produced.

The main scales found in the field are: i) sulfates of alkaline earth metals, barium (barite), strontium (celestite), calcium (anhydrite) and, to a lesser extent and sporadically, radium; ii) calcium (calcite) and iron (siderite) carbonates; iii) sodium chloride (halite); and further iv) mineral sulfides when $H_2S$ occurs.

Similar to other flow assurance problems, the formation of scales by the different inorganic salts native to produced water can have a profound impact on the productivity, integrity and safety of the well and other equipment that make up the system of production. The formation of scale promotes a decline in production that can be rapid or not, which makes it difficult to promptly identify the problem in different situations.

The assessment of the potential risk of scaling formation is carried out by chemically evaluating the composition of the production water and/or water mixture and by thermodynamic simulation in the MultiScale simulator. This simulator evaluates the three-phase solid-liquid-vapor equilibrium throughout the production system, models the pH of the aqueous phase as a function of pressure, temperature, ionic activity of the brine, alkalinity, bicarbonate and $CO_2$=content and calculates the solubility of the different salts under different conditions of temperature and pressure.

To carry out the simulation, information on the composition of water and the thermo-hydraulic profile (pressure and temperature data) of the production scenario is required. Based on this information, the risks of scale formation at different points of the system are predicted, herein defined as nodal points, which represent valves and lifting equipment in the path of the fluids. Information on the location of these points is acquired from different databases (reservoir, well and flow).

Thus, there is a need for better knowledge of the risk of flow assurance occurrences and the anticipation of decision-making in relation to a prevention procedure.

Document U.S. Ser. No. 10/311,173B2 describes a flow simulation model that integrates different models as a function of time, designated as sub-models (reservoir, well, flow and process) and the interface between the same. Information is obtained on the flow in the reservoir, flow patterns and phase separation in the fluid treatment system. The fluid variables considered are: density, viscosity and interfacial tension. The functionality of modeling paraffins, hydrates and asphaltenes using standard flow correlations is mentioned. However, these correlations are available in other commercial simulators such as Olga.

In the study by SOUZA, J. N. M. (2010) "Modelagem e simulação de escoamento multifásico em dutos de produção de óleo e gás natural", Thesis (Doctorate in Chemical and Biochemical Process Technology), 265p., School of Chemistry, Federal University of Rio de Janeiro—UFRJ, there is described a framework for the analysis of artificial lift systems by continuous gas lift using an optimization algorithm coupled to a stationary model of two-phase flow networks with any topology obtained from the simplification of a model biphasic dynamic. Mathematical modifications of classical flow correlations were performed. The outstanding result was the dynamic simulation of two-phase flow networks. The way it was organized, the model based on matrix representations, the elements that make up the network and the way the boundary conditions were defined contributed to the generation of a dynamic model of two-phase flow in pipeline networks composed of ordinary differential equations. However, this work addresses to modifications of classical flow correlations and has different objectives from the present invention.

NASCIMENTO, J. C. S. (2013) "Simulador de Escoamento Multifásico em Poços de Petróleo (SEMPP)", 134f., Dissertation (Masters in Oil Science and Engineering), Federal University of Rio Grande do Norte, Natal—RN, has as specific objectives the programming of multiphase flow models in pipes that include empirical correlations and mechanistic model, equations for evaluation of flow performance to calculate the PVT properties of fluids, marching algorithm for numerical integration of pressure and temperature gradient equations and, finally, validation of the simulator by comparing the results with a commercial simulator.

As can be seen, such references only describe multiphase flow simulators that evaluate parameters that are usually monitored in oil production activities. These simulators are based on empirical mathematical correlations to predict the behavior of flow rates, flow patterns and pressure and temperature behavior during multiphase flow. In general, they are used in the definition phase of design guidelines for production systems and, eventually, for monitoring the production. There are several commercial simulators, such as OLGA, Pipesim, Ledaflow and Alfasim, as well as the Marlim simulator.

Therefore, no document of the state of the art discloses a real-time system for monitoring flow assurance occurrences such as that of the present invention.

Thus, in order to solve such problems, the present invention was developed, not only through the search for data from these multiphase simulators, but also through the integration with thermodynamic simulations and production data, in addition to the application of specific algorithms which were defined with variables that are not available in commercial simulators or in the evaluated works.

In the case of the hydrate panel, the sub-cooling and water content of the fluid are considered to define the probability of the occurrence. In the paraffin monitoring panel, the critical zone of paraffin formation was defined as a function of the fluid temperature, the wax appearance point temperature, the temperature of the second crystallization event, the critical deposition temperature, with monitoring of the gas-oil ratio and production flow rate. In the emulsion monitoring panel, the water content of the emulsified and free fluid, the Reynolds number, the pressure differential, the moving average pressure upstream of the choke are considered, and the flow rate differential and the oil loss with emulsion production are calculated. In the scale panel, the nodal points (valves and equipment) associated with the geometry of the well are indicated in the thermo-hydraulic profile in order to predict the potential for the formation of inorganic solids.

In addition to monitoring the occurrences individually, the present invention shows all occurrences simultaneously, in the form of graphs and tables, allowing an integral view of the production system, which can be called a digital twin of flow assurance.

The present invention also allows a panoramic view of the problems and works as a checklist, developed based on accumulated experience, due to the intrinsic characteristics of production systems. Within the scope of a continuous learning process, the lessons learned can be adapted and/or improved to be used continuously in the configuration of the guidelines of the production designs. The developed system is a web tool integrated with the Multiphase Virtual Meter (MFM), the E&P Integrated Base and the platform supervision system. Monitoring integrates production data, obtained by sensors in the field, with thermodynamic simulations to predict blockage risks and data from specific analyses of fluids in the laboratory. Based on this information, and on the algorithms defined for each type of occurrence, the system shows the critical zone for paraffin formation, warning about the potential risk of hydrate formation in the operational control centers.

In short, the present invention has several advantages such as reducing production losses, reducing rig time, increasing oil and gas production, reducing man-hours used to evaluate an occurrence, reducing handling of chemicals and collection of samples on the platforms, flow assurance data in real time promoting greater reliability of information on occurrences in the production systems and reduction of risks associated with the business, reduction of operations at sea that cause contamination to the environment, and monitoring in time real information from offshore production systems.

BRIEF DESCRIPTION OF THE INVENTION

The present invention addresses to a real-time flow assurance occurrence monitoring system that uses a web tool to integrate results from multiphase flow simulations and thermodynamic simulators with production data and specific correlations, developed to monitor the formation of deposits or blockages in subsea lines, whose tool monitors the formation of hydrates, paraffins and emulsions in real time and other occurrences that may cause a production shutdown. In this way, it promotes the reduction of oil production losses due to occurrences in the flow assurance area.

The present invention can be applied in all maritime oil and gas production systems, in Brazil and in the world, since the production of oil and gas in deep and ultra-deep waters creates a favorable scenario for the occurrence of hydrates of natural gas due to the high pressure and low temperature conditions at the seafloor. In addition, the oils produced in Brazilian fields have paraffinic characteristics with a high potential risk of deposition; added to this, in the new scenarios there is a greater probability of risk of formation of inorganic scales.

BRIEF DESCRIPTION OF THE DRAWINGS

The present invention will be described in more detail below, with reference to the attached figures which, in a schematic way and not limiting the inventive scope, represent examples of its embodiment. In the drawings, there are.

DETAILED DESCRIPTION OF THE INVENTION

The system according to the present invention comprises a hydrate formation monitoring panel, a hydrate occurrence probability report, a paraffin formation monitoring panel, a shutdown occurrence monitoring panel, reports of pigging and soaking operations, an emulsion formation monitoring panel and a panel with identification of nodal points of inorganic scale in the thermo-hydraulic profile.

Figure 3:
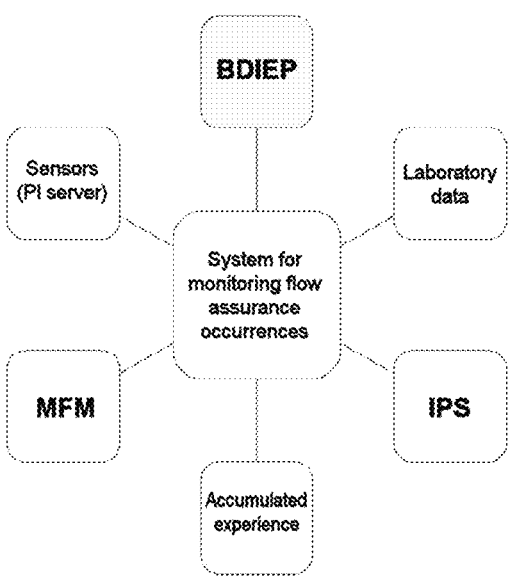
FIG. 3 illustrating a representation of the system architecture.

The monitoring panels for the formation of hydrates, paraffins and emulsions were developed in a tool that integrates production data with risk predicting systems for the occurrence of flow assurance blockages. This tool is coupled to the integrated E&P base with automatic search of well data and integrated with the MFM (Multiphase Flow Rate Meter) that uses the Marlim flow simulator. A graphical interface was developed to visualize the results through curves and tables. FIG. 3 shows the representation of the system architecture. Occurrences are monitored by operational unit, asset, platform and/or well and can be compared.

The development of panels in the tool aims at monitoring and preventing occurrences of loss of load and formation of deposits in subsea production lines and facilities in real time. The tool allows the opening of several well screens, shows the state of the wells (open and closed), the important production variables for the evaluation of flow assurance and compares the occurrences in wells on the same platform.

Hydrates

The formation of gas hydrates is the most recurrent cause of blockages and promotes greater losses in oil production, which are around 10,000 bbl/d. These losses are related to production shutdown time and operational procedures for intervention of wells.

In order to reduce oil losses due to the formation of hydrates in production systems, a panel was created to monitor and prevent the formation of hydrates in subsea production lines and facilities. This panel monitors in real time the pressure and temperature data obtained by the sensors of the operational units, simulated in MARLIM and available in the multiphase flow rate meter (MFM), the results of the thermodynamic simulations used to predict the formation of hydrates and data from the fluids and calculates the formation probability. As output data, there is the probability of occurrence depending on the depth (thermohydraulic profile), which is presented in table and graph format.

The calculation of the probability of occurrence was defined based on the history of hydrate formation in production fields and follows the steps below:

1. Acquisition of MFM simulation data (pressure and temperature) using the Marlim simulator;
2. Obtaining the hydrate curve by thermodynamic simulation (pressure and temperature);
3. Interpolation of the temperature in the curve;
4. Calculation of sub-cooling along the production profile of the production line (PL)–difference between the fluid temperature and the dissociation temperature for each pressure along the flow profile;
5. Definition of well sub-cooling, the highest sub-cooling value of the PL production profile;
6. Use of the defined reference sub-cooling scale to calculate the probability of hydrate formation (from −5° C. to 15° C.);
7. Use of BS&W as a correction factor in the hydrate formation probability scale, when BS&W is less than the critical BSW.

It should be noted that the scale defined for calculating the probability is being used by all wells, but the tool allows the configuration of adjustments according to the scenario. A record of available waiting time (AWT) for each well was also included. This is the time, after a production shutdown, that the operation can wait without risk of blockage. After this period, some procedure to prevent the occurrence must be carried out. The AWT tag was recorded in the IPS for signaling and alerting after a production shutdown.

Paraffins

Due to the complexity of the paraffin deposition process and the errors associated with the mathematical simulation of the occurrence, the oil properties and operational variables responsible for the occurrence in the production lines were defined based on history. Based on this information, a criterion was defined to indicate the critical zone of paraffin formation in the production line. In addition, all field operational variables are monitored in order to better predict occurrences in the near future through the variables with the greatest impact (machine learning).

The oil properties that have a direct influence on the pumping and flow conditions of the produced fluids are monitored: API density, viscosity, WAPT (Wax Appearance Point Temperature) and CDT (Critical Deposition Temperature). An extrinsic property, water content (BS&W), is also relevant for flow assurance and the potential for paraffin deposition. Based on these properties, some assumptions were defined for monitoring paraffin deposition:

Registration of WAPT data, $2^{nd}$ crystallization event and oil CDT;

Monitoring of the thermal profile of the flow when the $T_{flow} < CDT$ per well;

Monitoring flow and GOR (SIP data)×time;

Use of $T_{flow}$ (MFM), $T_{wall}$ (MFM), CDT×line length to identify the critical region of paraffin deposition.

Figure 4:
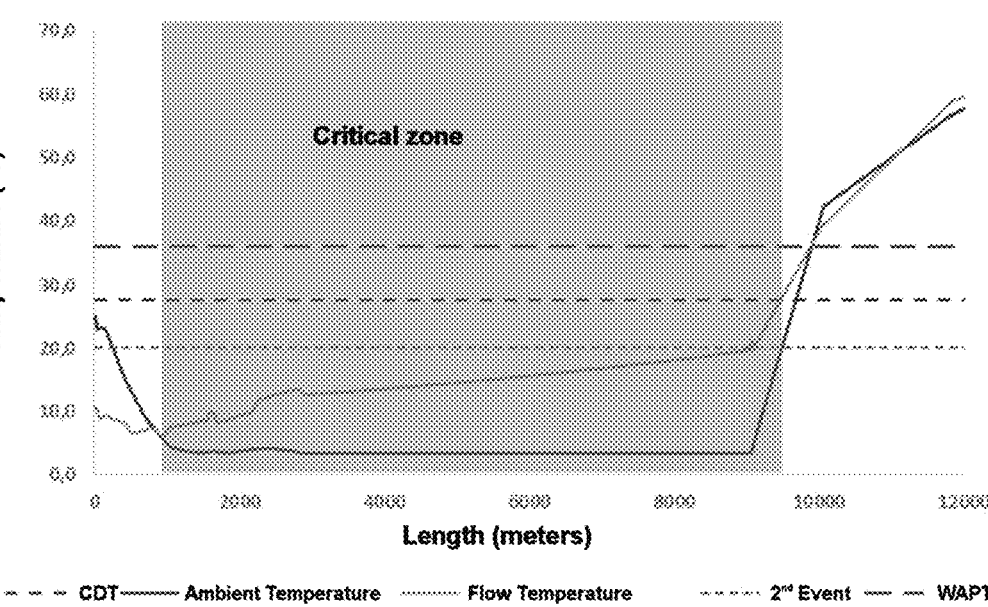
FIG. 4 illustrating an example of the curves used to define the conditions for monitoring paraffin formation and the critical deposition zone (hatched area).

For the definition of the critical deposition zone, the following assumptions were adopted:
1) $T_{flow} < CDT$
2) $T_{ambient} < T_{flow}$ This information is consolidated in the form of graphs and tables. The hatched area in FIG. 4 represents the critical deposition region on the production line, according to the assumptions adopted.

In the paraffin panel, the curves with the flow rate data (Q)×gas-oil ratio (GOR)×total gas-liquid ratio (TGLR) are also displayed. For wells without lift gas, only the GLR is reported (GLR=Qg/(Qo+Qw)).

$$\text{TGLR calculation formula} = (GLR*(Qo/(1-BSW)) + Qo*GOR)/(Qo/(1-BSW))$$

The consolidated information is useful in identifying wells with paraffin deposition potential, in quickly identifying regions of the line most susceptible to deposition based on the assumptions adopted, in the constant evaluation of assumptions based on operational history and, from a structured database (pigging/soaking reports), in the identification of other operational parameters that have a possible impact on the deposition process through analysis of now structured data (influence of flow rate, GOR, GLR, etc.).

The consolidation of these data and the consequent improvement in the assessment of the deposition risk help in monitoring the phenomenon and in the assertiveness of mitigation procedures, with an impact on the reduction of production losses, and will be used in machine learning to define of new monitoring assumptions.

Emulsions

The evaluation of emulsion formation in producing fields is monitored in the system by:

BS&W values over time;

Instability in production (graph of pressure variation as a function of time);

Calculation of pressure drop as a function of time;

Reynolds number information;

Information on the presence of free water;

Calculation of the oil gain potential with the destabilization of the emulsion;

Visualization of simulations in Marlim of the fluid without and with emulsion using viscosity data obtained in the laboratory;

Table with information and check list.

Some monitoring criteria were established, such as: pressure differential between pure and emulsified oil flow greater than 7%, BS&W greater than 30%, Reynolds number greater than $10^5$, absence of free water, among others. Consolidated information is used to select wells with the greatest potential for oil gain through the use of flow-enhancing products and is exported to other applications.

Shutdown

The occurrence of production shutdowns whose time is longer than the available waiting time (AWT) implies the need to carry out a hydrate prevention procedure. Accounting for the number of shutdowns that exceed the AWT in a given period, for the same well, is an indication of the probability of hydrate blockage (the more frequent these occurrences, the greater the chances of hydrate formation).

In addition, this monitoring is capable of contributing to production development designs, estimating operational efficiency based on the application of prevention procedures, as well as EFS studies for the application of a new technology, since it is possible to quantify production losses per well in these operations.

The data with this information are presented in bar graphs and tables.

Inorganic Scales

The thermo-hydraulic profiles obtained by the tool were associated with other databases to show the points with the greatest potential risk of scale formation (nodal points). The mapped nodal points are: chemical injection mandrel, WCT, DHSV, SESP, lift gas valve and SPU, among others. Pressure and temperature data at each of these points are available in table form for export to the MultiScale simulator.

Total Losses of Flow Assurance

The total losses of flow assurance will be quantified by an algorithm that will use the MFM simulation to calculate the theoretical flow rate and the flow rate calculation by the pressure variation in the choke to calculate the actual flow rate. This concept is related to the overall loss by the system (scaling, intermittency, emulsion) except hydrate, where there is no partial loss.

Pigging and Soaking Operations

The pigging and soaking operations are carried out to remove paraffin deposits along the subsea line.

In the developed tool, the reports of pigging and soaking operations were customized based on operational experience separating the steps of planning, execution and evaluation of results. The types of fluids used, the type, size and supplier of the pigs and the most used process variables were predefined, but the system allows the customization of this information.

The operations registration form includes the dates and times of start and end of operations, step by step, information on fluids and pigs and has free fields for notes. Operations can be compared and reports sent in different formats. There is a modal of graphs referring to PIG operations (number of losses per pass, reason for losses per pass, efficiency of PIG passes, number of passes, pig integrity, among others).

EXAMPLES

The following examples are presented in order to more fully illustrate the nature of the present invention and the way to practice the same, without, however, being considered as limiting its content.

Figure 1:
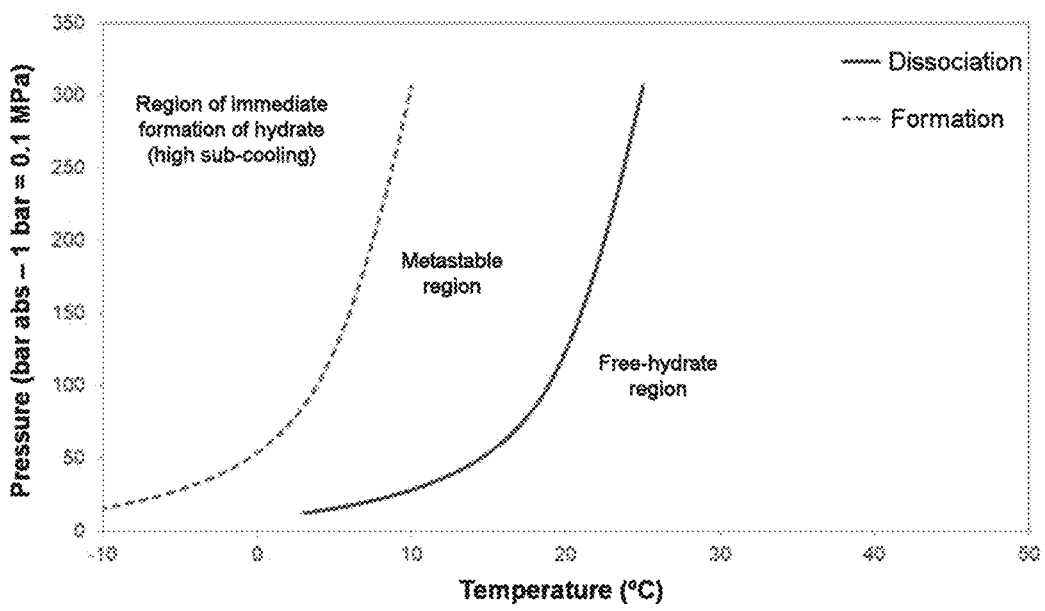
FIG. 1 illustrating a curve of pressure versus temperature, representing the favorable conditions for the formation of hydrates.
Figure 2:
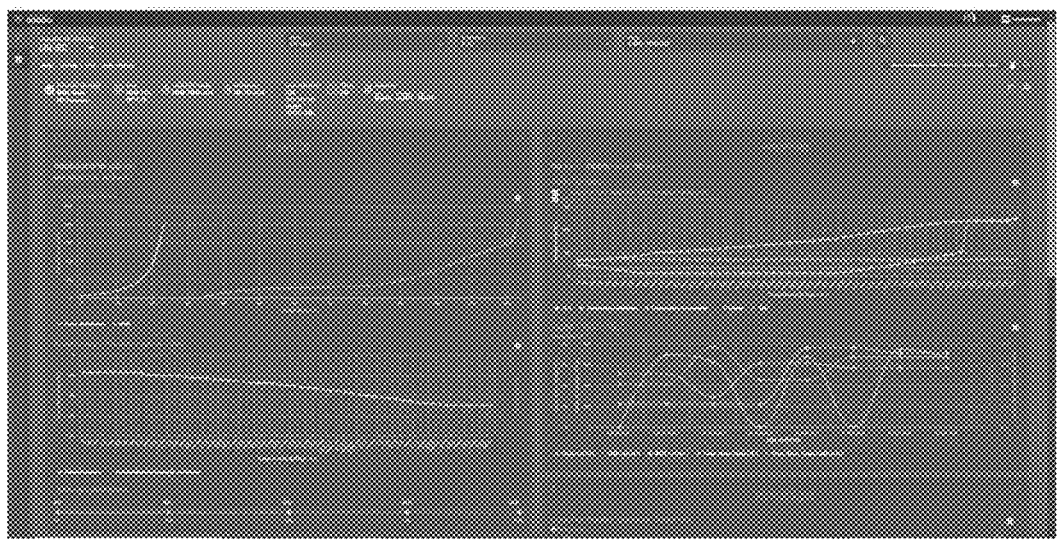
FIG. 2 illustrating a screen of the tool showing the panels of hydrates and paraffins.

The tool contains a panel for each occurrence, based on the important field variables and the specific algorithms that were defined, but it also integrates the information for a panoramic view of the occurrences. The hydrate formation monitoring panel shows the moment when the pressure and temperature conditions of the fluids in production enter the hydrate phase envelope in real time. The pressure and temperature curves obtained in the MFM (with real data) and the predicted curve of hydrate formation by thermodynamic simulation are compared with updates every 5 minutes (FIG. 2). Based on these curves, the probability of formation of hydrates is calculated considering a scale of sub-cooling defined through accumulated experience, based on occurrences over the years of the operator.

The graph of pressure versus temperature, the graph of the probability of occurrence versus the length of the subsea line for visualization in the region of greatest risk and the probability scale are presented. The data is also presented in tabular form and can be easily exported to other systems. The tag of hydrate formation probability for each well was recorded in the Intelligent Production Surveillance (IPS) system. In the IPS, assumptions were defined for the alert of occurrences that are visualized by the operators in the panels of the control room. When the probability is considered high, starting from a defined value, there is an alert and the operators follow the established procedures to prevent the occurrence. Subsequently, the gain with the anticipation of information about the occurrence is quantified.

In the paraffin panel, oil characterization data obtained in the laboratory (WAPT, $2^{nd}$ event and CDT) and fluid and ambient temperature data are presented. This information is evaluated within the occurrence criticality criterion defined above and appears highlighted in a hatched area in the graph (FIG. 4). The flow rate values and gas-liquid ratio are also presented. All data is displayed in graphs and tables and can be printed or exported to other systems.

In the emulsions panel, pressure drop as a function of time with the increase in BS&W and previously defined checklist items are monitored. The information from several wells is compared and from these data the wells with the greatest potential for oil gain with the subsea injection of demulsifier are selected.

It should be emphasized that the gains related to this invention are:

Anticipation of knowledge of the occurrence;

Reduction of production losses related to the formation of hydrates and paraffins;

Increased operational efficiency;

Reduction of decision-making time;

Identification of alternatives to increase production;

Integrated view of occurrences;

Obtaining a history of structured cases for future machine learning work to adjust probability calculation scales or include new boundary conditions.

Considering that the losses related to flow assurance occurrences are very high, with the anticipated and integrated information of the occurrences in a single environment, it is expected to reduce the current production losses. A reduction of just 10% of these losses (around 25,000 bopd) already promotes a benefit of around 45 million USD/year (25,000 bopd×10%×365×50 USD/barrel).

It should be noted that, although the present invention has been described in relation to the attached drawings, it may undergo modifications and adaptations by technicians skilled on the subject, depending on the specific situation, but provided that within the inventive scope defined herein.

The invention claimed is:

1. A system for monitoring real-time flow assurance occurrences, wherein the system comprises:

a hydrate formation monitoring system configured to:

obtain pressure and temperature data from sensors of a production system, perform a first thermodynamic simulation of the production system, and calculate hydrate formation probability using the obtained pressure and temperature data and results of the first thermodynamic simulation, a paraffin formation monitoring system configured to:

identify oil properties and operational variables responsible for paraffin formation based on historical production data, define a criterion to indicate a critical zone of paraffin formation using the identified oil properties and operational variables, obtain oil properties and operational variable data from the production system, and assess a risk for paraffin formation based on the defined criterion and the obtained oil properties and operational variable data, a shutdown occurrence monitoring system configured to:

determine hydrate blockage probability of the production system based on a number of production shutdowns that exceed available waiting time (AWT), an emulsion formation monitoring system configured to:

establish criteria for emulsion formation; and evaluate emulsion formation in the production system by monitoring at least one property of the production system and comparing it to the established criteria, a system with identification of nodal points of inorganic scale in a thermo-hydraulic profile configured to:

obtain the thermo-hydraulic profile of the production system, perform a second thermodynamic simulation of the production system, and assess a risk for scale formation using the obtained thermo-hydraulic profile and results of the second thermodynamic simulation, an Intelligent Production Surveillance (IPS) configured to alert an operator of a risk of occurrences of blockages of flow assurance, and a graphical interface for providing an integral view of the production system that includes risks of occurrences of blockages of flow assurance predicted using the hydrate formation monitoring system, the paraffin formation monitoring system, the shutdown occurrence monitoring system, the emulsion formation monitoring system, and the system with identification of nodal points of inorganic scale in the thermo-hydraulic profile.

2. The system according to claim 1, wherein a multiphase flow rate meter (MFM) displays a reading of pressure× temperature profiles generated every 5 minutes and a reading for loading geometry and nodal points.

3. The system according to claim 2, wherein the nodal points comprise a chemical injection mandrel, wet Christmas tree (WCT), downhole safety valve (DHSV), subsea electrical submersible pumping (SESP), lift gas valve, and stationary production unit (SPU).

4. The system according to claim 1, wherein the intelligent production surveillance (IPS) shows an indication of the hydrate formation probability.

5. The system according to claim 1, wherein the system for monitoring real-time flow assurance occurrences displays data reading from a web tool.

6. The system according to claim 1, wherein the at least one property of the production system comprises a pressure drop resulting from a formation of emulsions.

* * * * *